(12) United States Patent
Law

(10) Patent No.: US 11,113,222 B2
(45) Date of Patent: Sep. 7, 2021

(54) NAND SWITCH

(71) Applicant: KIOXIA CORPORATION, Tokyo (JP)

(72) Inventor: Sie Pook Law, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 98 days.

(21) Appl. No.: 16/726,763

(22) Filed: Dec. 24, 2019

(65) Prior Publication Data

US 2020/0142849 A1 May 7, 2020

Related U.S. Application Data

(63) Continuation of application No. 14/175,269, filed on Feb. 7, 2014, now Pat. No. 10,521,387.

(51) Int. Cl.
*G06F 13/40* (2006.01)
*G06F 13/16* (2006.01)

(52) U.S. Cl.
CPC .......... *G06F 13/40* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 5,257,233 A | 10/1993 | Schaefer | |
| 7,668,524 B2 | 2/2010 | Law et al. | |
| 8,359,445 B2 * | 1/2013 | Ware | G11C 11/4076 711/167 |
| 8,484,415 B2 | 7/2013 | Cho | |
| 8,572,320 B1 | 10/2013 | Maheshwari | |
| 8,984,256 B2 | 3/2015 | Fish | |
| 8,996,785 B2 | 3/2015 | Lee et al. | |
| 9,432,298 B1 | 8/2016 | Smith | |
| 2001/0016789 A1 | 8/2001 | Staiger | |
| 2004/0199711 A1 * | 10/2004 | Byers | G06F 3/0626 711/100 |
| 2005/0278512 A1 * | 12/2005 | Ehlig | G06F 9/30065 712/228 |
| 2006/0250884 A1 | 11/2006 | Shimbayashi | |
| 2008/0140724 A1 | 6/2008 | Flynn et al. | |
| 2008/0147968 A1 | 6/2008 | Lee et al. | |

(Continued)

*Primary Examiner* — Henry Tsai
*Assistant Examiner* — Christopher A Bartels
(74) *Attorney, Agent, or Firm* — Kim & Stewart LLP

(57) ABSTRACT

In a memory system, a switch is connected between a controller and multiple non-volatile storage units, where the switch comprises first and second pins, a data bus, and a plurality of enable outputs. Each of the enable outputs of the switch is connected to an enable input of one of the non-volatile storage units. The switch is configured to transmit a signal to enable a communication path between the controller and one of the non-volatile storage units and to receive data over the data bus to be stored in one of the non-volatile storage units when the first and second pins are not asserted. In addition, the switch is configured to receive a command to be executed by one of the non-volatile storage units when the first pin is not asserted and the second pin is asserted. The switch is also configured to receive an address of a storage location within one of the non-volatile storage units when the first pin is asserted and the second pin is not asserted.

18 Claims, 10 Drawing Sheets

(56) References Cited

U.S. PATENT DOCUMENTS

| | | | |
|---|---|---|---|
| 2008/0235443 A1* | 9/2008 | Chow | G06F 12/1416 |
| | | | 711/103 |
| 2008/0256281 A1 | 10/2008 | Fahr et al. | |
| 2008/0256352 A1* | 10/2008 | Chow | G11C 11/5621 |
| | | | 713/2 |
| 2009/0168525 A1 | 7/2009 | Olbrich et al. | |
| 2009/0248969 A1 | 10/2009 | Wu et al. | |
| 2009/0310406 A1 | 12/2009 | Sarin et al. | |
| 2009/0319708 A1 | 12/2009 | Ho et al. | |
| 2009/0327588 A1 | 12/2009 | Sutardja et al. | |
| 2010/0082881 A1 | 4/2010 | Klein | |
| 2010/0325347 A1 | 12/2010 | Koh | |
| 2010/0329007 A1* | 12/2010 | Chibvongodze | G11C 19/00 |
| | | | 365/185.05 |
| 2011/0125939 A1 | 5/2011 | Miyauchi | |
| 2011/0164460 A1 | 7/2011 | Kajigaya et al. | |
| 2011/0307644 A1 | 12/2011 | Cho | |
| 2011/0314204 A1* | 12/2011 | Ootsuka | G11C 16/06 |
| | | | 711/103 |
| 2012/0159072 A1 | 6/2012 | Hida et al. | |
| 2012/0233380 A1* | 9/2012 | Butterfield | G06F 3/0665 |
| | | | 711/103 |
| 2012/0254500 A1 | 10/2012 | Cho et al. | |
| 2012/0254501 A1 | 10/2012 | Cho et al. | |
| 2013/0086305 A1 | 4/2013 | Ishikawa et al. | |
| 2014/0032812 A1* | 1/2014 | Ong | G11C 13/0002 |
| | | | 711/102 |
| 2015/0377967 A1 | 12/2015 | Thiruvengadam et al. | |
| 2016/0011813 A1* | 1/2016 | Ellis | G11C 29/52 |
| | | | 714/763 |

\* cited by examiner

NAND SWITCH

CROSS-REFERENCE TO RELATED APPLICATION

This application is a continuation of U.S. patent application Ser. No. 14/175,269, filed Feb. 7, 2014, the entire contents of which are incorporated herein by reference.

BACKGROUND

The storage capacity of solid state drives (SSDs) continues to increase. That is, SSDs are able to support an ever-increasing number of storage units, such as NAND flash memory units. As storage capacity of SSDs increases, it has become increasingly difficult to scale SSD controllers, which are typically implemented on integrated circuit chips, and which are used to write data to NAND flash memory units and to read data from NAND flash memory units through general-purpose input/output (or GPIO) pins and chip enable (or CE) pins.

With an increasing number of NAND flash memory units supported by present-day disks (greater than 2 terabytes of storage capacity), a greater number of connections from SSD controllers to the NAND flash memory units is required. However, allocating more GPIO and CE pins has a disadvantage because allocating more pins would increase the size of the die package required for the manufacture of the SSD controller. Thus, the cost of manufacturing the SSD controller would increase dramatically. Further, laying out an SSD integrated circuit comprising additional NAND flash memory pin connections would also be costly and disruptive to current SSD controller manufacturing processes. Hence, it would be advantageous to provide a mechanism whereby existing SSD controllers can support disks that have NAND flash memory capacity in excess of 2 terabytes.

SUMMARY OF THE DISCLOSURE

According to one embodiment, a memory system is provided. The memory system comprises a controller configured with one or more enable outputs, a plurality of non-volatile storage units, each configured with an enable input, and a switch configured with an enable input that is connected to one of the enable outputs of the controller. The switch is further configured with first and second pins, a data bus, and a plurality of enable outputs, each of which is connected to an enable input of one of the non-volatile storage units. The switch is configured to transmit a signal to enable a communication path between the controller and one of the non-volatile storage units and to receive data over the data bus to be stored in one of the non-volatile storage units when the first and second pins are not asserted. The switch is further configured to receive a command to be executed by one of the non-volatile storage units when the first pin is not asserted and the second pin is asserted and to receive an address of a storage location within one of the non-volatile storage units when the first pin is asserted and the second pin is not asserted.

According to another embodiment, a method of performing read and write operations in a memory system is provided, where the memory system includes a controller connected to multiple non-volatile storage units by way of a switch. The switch comprises first and second pins, a data bus, and a plurality of enable outputs, each of which is connected to an enable input of one of the non-volatile storage units. The method comprises the steps of transmitting a signal to enable a communication path between the controller and one of the non-volatile storage units and receiving data over the data bus to be stored in one of the non-volatile storage units when the first and second pins are not asserted. The method further comprises the step of receiving a command to be executed by one of the non-volatile storage units when the first pin is not asserted and the second pin is asserted. The method also includes the step of receiving an address of a storage location within one of the non-volatile storage units when the first pin is asserted and the second pin is not asserted.

According to another embodiment, a memory system is provided. The memory system comprises a controller configured with one or more chip enable outputs and a switch configured with a chip enable input that is connected to one of the chip enable outputs of the controller and having multiple chip enable outputs. The memory system further comprises multiple non-volatile storage units each configured with a chip enable input that is connected to one of the chip enable outputs of the switch.

DETAILED DESCRIPTION

Figure 1:
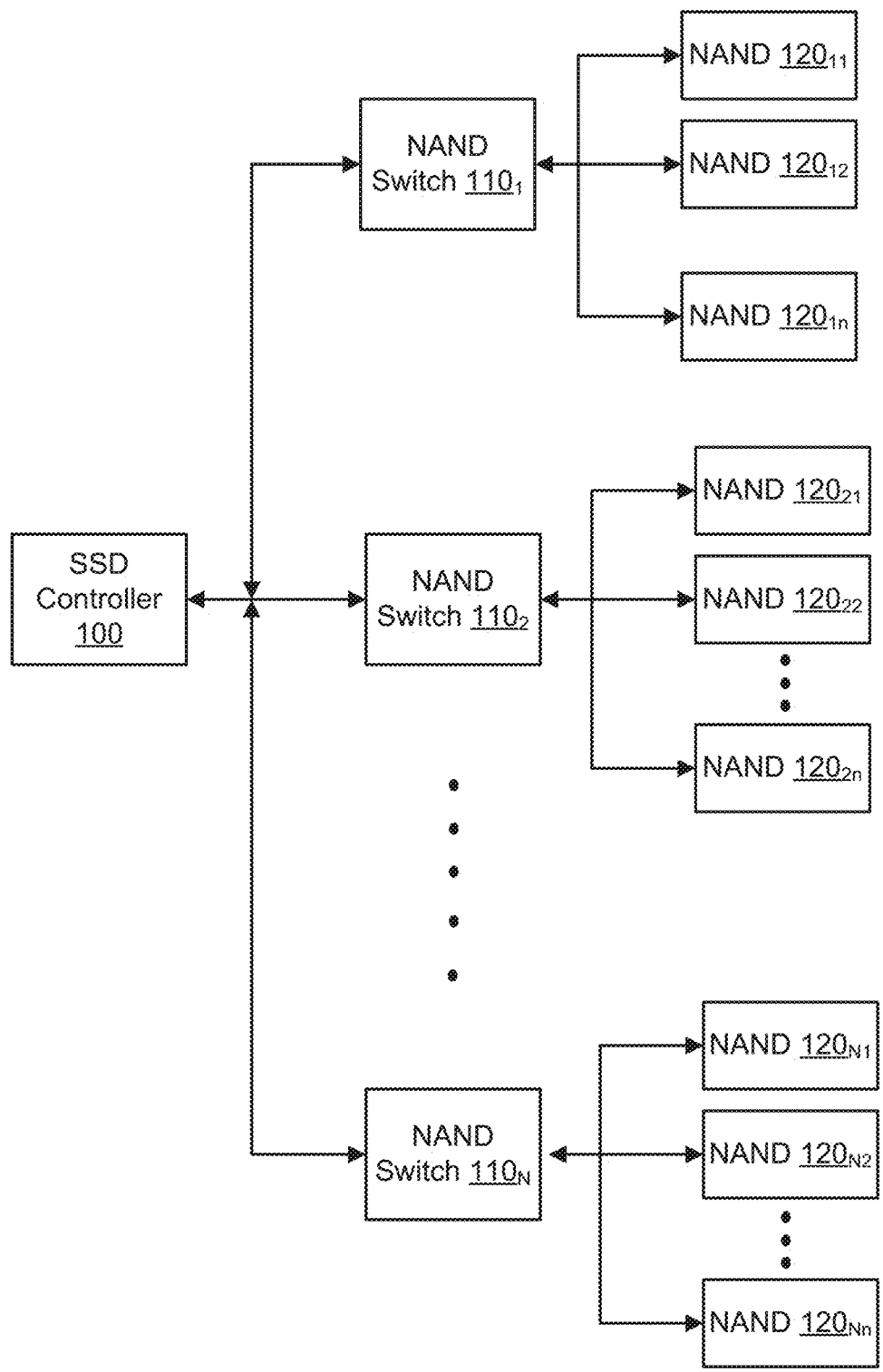
FIG. 1 is a block diagram that depicts a memory system according to one or more embodiments.

FIG. 1 is a block diagram that depicts a memory system according to one or more embodiments. The system depicted in FIG. 1 comprises a solid state disk (SSD) controller 100, a plurality of NAND switches 110, and plurality of NAND storage devices 120. In embodiments, SSD controller 100 is an electronic device that provides a host computer that is connected to it access to NAND memory components. Typically, SSD controller 100 is a semiconductor processor that executes firmware-level code, and which performs various functions that include reading and writing data from and to NAND memory components, caching, error correction, data encryption, and garbage collection. SSD controller 100 communicates with other devices by way of electrical signals, which are typically received and transmitted through "pin" connections. Each pin is capable of transmitting or receiving an electrical signal which represents a binary 0 or 1 value (or bit value). Typically, a 0 value is represented by a low voltage signal, while a 1 value is represented by a high voltage signal. Pins may be categorized, in embodiments, as general purpose input/output (or GPIO) pins, which typically transmit and receive data to be read from or stored to memory. In addition, GPIO pins of SSD controller 100 transmit and receive address data, which, for example, may refer to storage locations within a NAND storage device 120, or, in other cases, may refer to a register of a NAND storage device 120. SSD controllers may also include "chip enable" (or CE) pins. CE pins are typically used to activate one or more devices to which the SSD controller is connected. For example, SSD controller 100 may be connected to an array of NAND storage devices 120. In order to activate one of the NAND storage devices 120, SSD controller 100 may transmit a particular value (either a 0 or 1) over a CE pin that is coupled to the target NAND storage device 120. In some embodiments, transmitting a 0 value serves to activate the target NAND storage device 120. In other embodiments, transmitting a 1 value activates the target NAND storage device 120. Once the target NAND device 120 is activated (or "enabled"), SSD controller 100 may then transmit data to and read data from the target NAND storage device 120. Equivalently, the activation of the NAND storage device 120 enables a communication path between SSD controller 100 and the activated NAND storage device. The transmission of a value over a CE pin in order to activate a device to which SSD controller is connected is referred to herein as "asserting" the CE pin.

As shown in FIG. 1, SSD controller 100 is connected to one or more NAND switches 110. Each NAND switch 110 is configured to be activated by SSD controller 100 (in embodiments, activation is achieved through assertion of a CE pin of the NAND switch 110 that is connected to a corresponding CE pin of SSD controller 100). According to one or more embodiments, each NAND switch 110 includes discrete logic devices and circuitry that enables it to establish a communication path between SSD controller 100 and selected NAND storage devices 120. Once a NAND switch 110 is instructed by SSD controller 100 to establish a communication path between SSD controller and one or more NAND storage devices 120, the NAND switch 110 acts as a conduit for input/output data to be stored to/read from NAND storage devices 120, addresses of storage locations within the NAND storage devices 120, and commands to be executed by the NAND storage devices 120. Further, according to embodiments, each NAND switch 110 may be configured to sever a communication path between SSD controller 100 and one or more NAND storage devices 120. In one or more embodiments, this severing of communication paths may be accomplish by "de-asserting" a CE pin that is connected to the NAND storage device 120 that is located on the communication path that is to be severed. In some embodiments, de-assertion of a pin is accomplished by transmitting a signal on the pin that is opposite to the signal that asserts the pin. For example, if a particular pin is asserted by the transmission of a 0 value in embodiments, such a pin is de-asserted by transmitting a 1 value over it.

As is further shown in FIG. 1, each NAND switch 110 is connected to one or more NAND storage devices 120. According to embodiments, a NAND switch 110 receives a command from SSD controller 110 to select one or more NAND storage devices 120 to which the NAND switch 110 is connected. As previously mentioned, selection of a NAND storage device 120 by NAND switch 120 enables a communication path between SSD controller 100 and the selected NAND storage device 120. Further, selection may be performed, in one or more embodiments, by asserting a pin of the NAND switch 110 that is connected to a corresponding pin of the NAND storage device 120. In embodiments, each NAND storage device 120 is a non-volatile semiconductor memory device, where stored data persists even when the device is not electrically powered. NAND storage devices 120 are equipped with CE pins that allow each of the devices to be activated, as well as GPIO pins that serve to transmit and receive commands, addresses, and I/O data.

Figure 2:
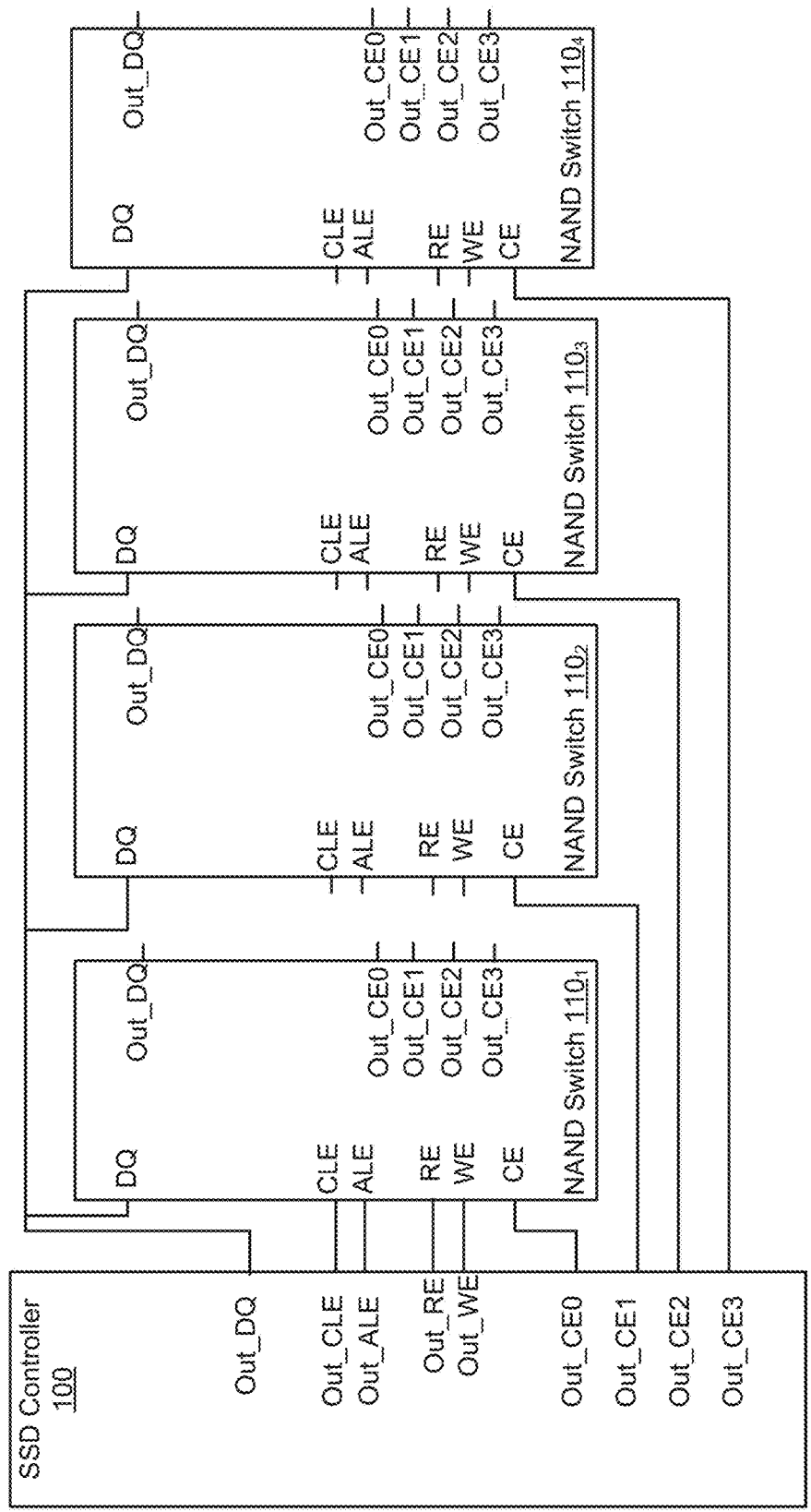
FIG. 2 is a block diagram that depicts a connection between an SSD controller and a plurality of NAND switches, according to one or more embodiments.

FIG. 2 is a block diagram that depicts a connection between an SSD controller 100 and a plurality of NAND switches 110, according to one or more embodiments. As shown, SSD controller 100 includes a plurality of output pins, which are denoted in the figures with the prefix "Out." SSD controller 100 includes an Out_DQ pin, which, in embodiments, may actually comprise 1, 8, or more physical pins. Indeed, the totality of pins that comprise Out_DQ may be referred to as a "data bus." Data is transmitted over Out_DQ, where the transmitted data may be I/O data to be stored within a NAND storage device 120. Further, data transmitted through Out_DQ may be a command to be executed by a NAND storage device 120, or to be executed by a NAND switch 110. In addition, data transmitted through Out_DQ (i.e., the "data bus") may be address data, which may refer to storage locations within a NAND storage device 120, or to a register within a NAND storage device 120 or a NAND switch 110. As depicted in FIG. 2, Out_DQ is connected in parallel to each of four NAND switches $110_{1-4}$. Out_DQ of SSD controller 100 is connected to a corresponding DQ pin (or plurality of pins) of each NAND switch 110, which allows all data transmitted over the data bus to be received by each NAND switch 110, provided the NAND switch 110 is activated.

In FIG. 2, SSD controller 100 also includes Out_CLE and Out_ALE pins. These pins are connected to corresponding CLE and ALE pins of each NAND switch 110. The function of the Out_CLE and Out_ALE pins is to communicate the nature of data to be communicated to a target device (whether a NAND switch 110 or a NAND storage device 120) at some future time. In embodiments, pins are asserted and data is transmitted over a data bus at discrete points in time, referred to as "clock cycles." In one or more embodiments, SSD controller 100 is equipped with a clock signal generator (not shown in FIG. 2) which allows for the synchronization of pin assertions, data transmissions, command execution by target devices, and the like. Thus, during a given clock cycle, the Out_CLE and Out_ALE pins are asserted according to an assertion pattern. Possible patterns are 00, 01, 10, and 11, where the left bit corresponds to the CLE pin assertion and the right bit corresponds to the ALE pin assertion. This assertion communicates to a target device what sort of data is to be transmitted over the data bus (i.e., through Out_DQ to the DQ pins of the target device) in a subsequent clock cycle.

For example, in one or more embodiments, SSD controller 100 asserts a 0 (or low voltage) on both the Out_CLE pin and Out_DQ pin. This assertion (i.e., "00") communicates to the target NAND device (in the depiction of FIG. 2, this would be NAND switch $110_1$) that, during a subsequent clock cycle, I/O data is to be transmitted over the data bus. I/O data is, typically, data that is to be stored within a storage location of a NAND storage device 120.

Continuing with the example, SSD controller 100 may also assert a 1 (or high voltage) on the Out_CLE pin and a 0 on the Out_ALE pin. In the depiction shown in FIG. 2, this communicates to the target device (i.e., NAND switch $110_1$) that a command is to be transmitted over the data bus during a future clock cycle. Indeed, "CLE" typically stands for Command Latch Enable, and signifies that a command is to be transmitted by a source device and is to be expected (and executed) by a target device.

Further, in embodiments, SSD controller 100 may assert a 0 on the Out_CLE pin and a 1 on the Out_ALE pin. This assertion pattern serves to communicate to a target device that an address is to be transmitted on the data bus during some future clock cycle. Indeed, "ALE" typically stands for Address Latch Enable, which signifies that a target device is to expect the transmission of an address by a source device. Addresses may be storage locations inside of a NAND storage device 120. Addresses may also designate registers inside of a NAND storage device 120 or a NAND switch 110.

According to embodiments, SSD controller 100 may also assert a 1 on both the Out_CLE and Out_ALE pins. As will be described herein, such an assertion pattern is not used by a NAND storage device 120, but is recognized by one or more embodiments of a NAND switch 110. In such embodiments of NAND switch 110, the NAND switch is instructed to recognize a data pattern transmitted over the data bus during a future clock cycle, where such data pattern is used by the NAND switch to activate one or more NAND storage devices 120.

As shown in FIG. 2, SSD controller 100 also includes Out_RE and Out_WE pins. An Out_RE pin is a "read enable" pin. The Out_RE pin is connected to a corresponding RE pin of a target NAND switch 110. In embodiments, the signal transmitted over the Out_RE pin communicates to a target device (typically a NAND storage device 110) to output a current data value located at a given storage location within the target device, and to increment an internal address counter to reference a subsequent storage location. The Out_WE pin is a "write enable" pin. As shown, the Out_WE pin is connected to a corresponding WE pin of a target NAND switch 110. In embodiments, the signal transmitted over the Out_WE pin triggers a target device (i.e., a NAND storage device 120 or NAND switch 110) to read data on the data bus (i.e., through the data pins comprising DQ). This behavior may be referred to as "clocking" data into the target device (e.g., addresses, I/O data, or commands). In embodiments, a target NAND switch 110 (or NAND storage device 120) reads the data transmitted to it over the data bus at the rising edge of the signal transmitted over the Out_WE pin.

In addition, SSD controller 100 includes a plurality of Out_CE pins. As mentioned previously, CE typically stands for "chip enable." As shown in FIG. 2, SSD controller 100 includes four output CE pins, namely, Out_CE0, Out_CE1, Out_CE2, and Out_CE3. In other embodiments, SSD controller 100 may include more or less output CE pins. As shown, each of the Out_CEn pins of SSD controller 100 is connected to a corresponding CE pin of a NAND switch 110. Thus, Out_CE0 is connected to the CE pin of NAND switch $110_1$, Out_CE1 is connected to the CE pin of NAND switch $110_2$, Out_CE2 is connected to the CE pin of NAND switch $110_3$, and Out_CE 3 is connected to the CE pin of NAND switch $110_4$. In embodiments, SSD controller 100 asserts one or more of its Out_CEn pins in order to activate the corresponding NAND switch 110 to which the Out_CE pin is connected. For example, SSD controller 100 asserts Out_CE0 in order to activate NAND switch $110_1$. It should be noted that, until a NAND switch 110 has been activated (or "enabled") by way of assertion of its CE pin, such NAND switch 110 is not activated and will not recognize any data transmitted to it over the data bus (i.e., its corresponding DQ pins), nor will it recognize the assertion of its CLE, ALE, RE, or WE pins. Further, SSD controller 100 may also "de-assert" any or all of its Out_CEn pins in order to deactivate an already active NAND switch 110. In one or more embodiments, de-assertion of a NAND switch 110 may be performed by asserting a 0 value (or low voltage) on the Out_CEn pin that is connected to the CE pin of the NAND switch 110 that is to be deactivated.

As was previously described, each of the NAND switches 110 depicted in FIG. 2 includes pins DQ, CLE, ALE, RE, WE, and CE, which are coupled to corresponding output pins of SSD controller 100. Further, each of the NAND switches 110 includes output pins that transmit data to other devices that the NAND switches 110 are connected to. According to the embodiment depicted in FIG. 2, each NAND switch 100 includes an Out_DQ pin (or set of pins, as the case may be), which represents a data bus output for the switch. Thus, in some embodiments, data that is received by a NAND switch 110 over the data bus through pins DQ is subsequently transmitted over pins Out_DQ. Further, each NAND switch 110 depicted includes four Out_CE pins, namely, Out_CE0, Out_CE1, Out_CE2, and Out_CE3. These CE pins perform a similar function as the Out_CE pins of SSD controller 100, that is, to activate (or enable) communication with a device to which a particular CE pin is connected. Such a device is typically a NAND storage device 120, although connection from a NAND switch 110 to other types of electronic devices is contemplated and is within the scope of the present invention. Further, although each NAND switch 110 is depicted as having four Out_CE pins, it should be noted that other embodiments include less or more Out_CE pins than the embodiment depicted in FIG. 2. Further, NAND switches 110 may also include other output pins (such as clock signal pins, as well as ALE and CLE pins), and it is noted that such embodiments are also within the scope of the present invention.

Figure 3:
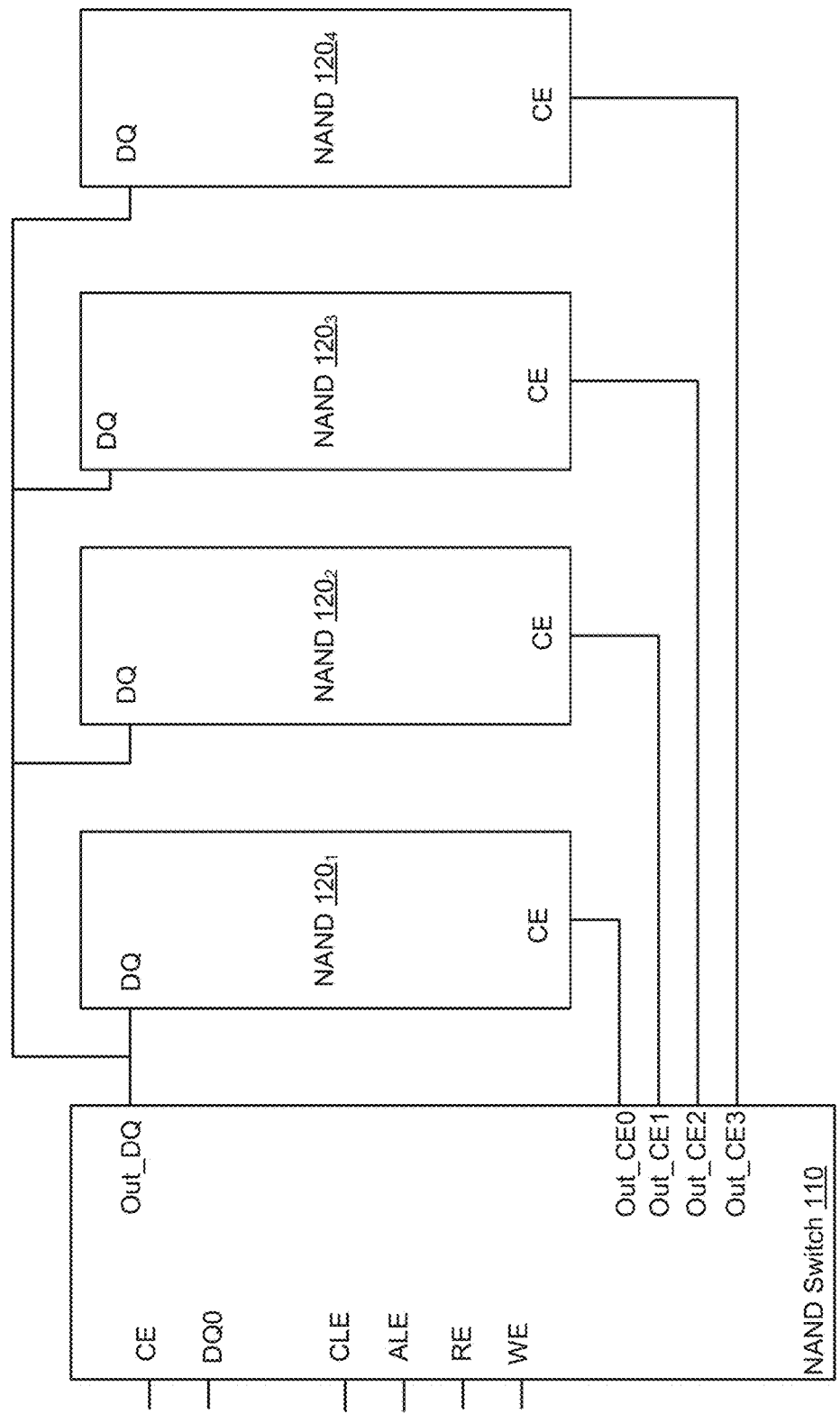
FIG. 3 is a block diagram that depicts a connection between a NAND switch and a plurality of NAND storage devices, according to one or more embodiments.

FIG. 3 is a block diagram that depicts a connection between a NAND switch 110 and a plurality of NAND storage devices 120, according to one or more embodiments. In the embodiment depicted in FIG. 3, a single NAND switch 110 is connected to four NAND storage devices $120_1$-$120_4$. As was also shown in FIG. 2, NAND switch 110 includes a CE pin (over which communication to SSD controller 100 is activated), as well as CLE, ALE, RE, and WE pins. The functional behavior of each of these pins is the same as described previously with respect to FIG. 2. In addition, NAND switch 110 includes an Out_DQ pin (or set of pins), which serves as an output data bus for the switch. As shown, Out_DQ (i.e., the output data bus) is connected, in a parallel fashion, to each of the NAND storage devices $120_{1-4}$. The connection of the data bus to each of the NAND storage devices 120 is made at a corresponding DQ pin for each of the storage devices. The NAND switch 110 also includes an Out_CE pin that is separately connected to each CE pin of the NAND storage devices 120. Thus, as shown, Out_CE0 is connected to the CE pin of NAND storage device $120_1$, Out_CE1 is connected to the CE pin of NAND storage device $120_2$, Out_CE2 is connected to the CE pin of NAND storage device $120_3$, and OutCE3 is connected to the CE pin of NAND storage device $120_4$.

In embodiments, NAND switch 110 is configured to receive an indication from SSD controller 100 (depicted in FIG. 2) to enable a communication path from SSD controller 100 to one or more target NAND storage devices 120. As previously mentioned, this eliminates the necessity for an SSD controller to allocate a large number of GPIO or CE pins to support connectivity to a large number of NAND storage devices. Embodiments of NAND switch 110 receives an indication to enable a communication path by way of the CLE and ALE pins, and, subsequently, through data received from the data bus through pins DQ. In other embodiments, NAND switch 110 may receive a command to set a feature (or internal component) of the switch to serve as an indicator as to what NAND storage device 120 SSD controller 100 is to communicate with. In these embodiments, NAND switch 110 is a device that interacts with SSD controller 100 and NAND storage devices 120 using some well-known protocol (such as Toggle/ONFI). In still another embodiment, NAND switch 110 may receive a manufacturer-specific command (i.e., a command that is not a part of the Toggle/ONFI command set) which serves as the indicator that NAND switch 110 is to enable a communication path from SSD controller 100 to one of the NAND storage devices 120.

After receiving the indication to enable the communication path (regardless of the method by which such indication is received), NAND switch 110 asserts the appropriate Out_CE pin in order to enable the desired communication path. For example, if SSD controller 100 is to store data to NAND storage device $120_1$, then a communication path between the controller and the storage device must be enabled. Thus, SSD controller 100 instructs NAND switch 110 to enable that path and, once the path is enabled, NAND switch 110 serves as a transmission link in that path. The path is enabled by NAND switch 110 asserting Out_CE0, which is connected to the CE pin for NAND storage device $120_1$. This activates a communication path to NAND storage device $120_1$ and communication is thus enabled from SSD controller 100 to NAND storage device $120_1$ by way of NAND switch 110. Thus, data that is transmitted from SSD controller 100 to be stored at a storage location within NAND storage device $120_1$ is transmitted from SSD controller 100 to NAND switch 110 (using the data bus between Out_DQ of SSD controller 100 and DQ of NAND switch 110), and then from NAND switch 110 to NAND storage device $120_1$ (using the data bus between Out_DQ of NAND switch 110 and DQ of NAND storage device $120_1$).

Figure 4:
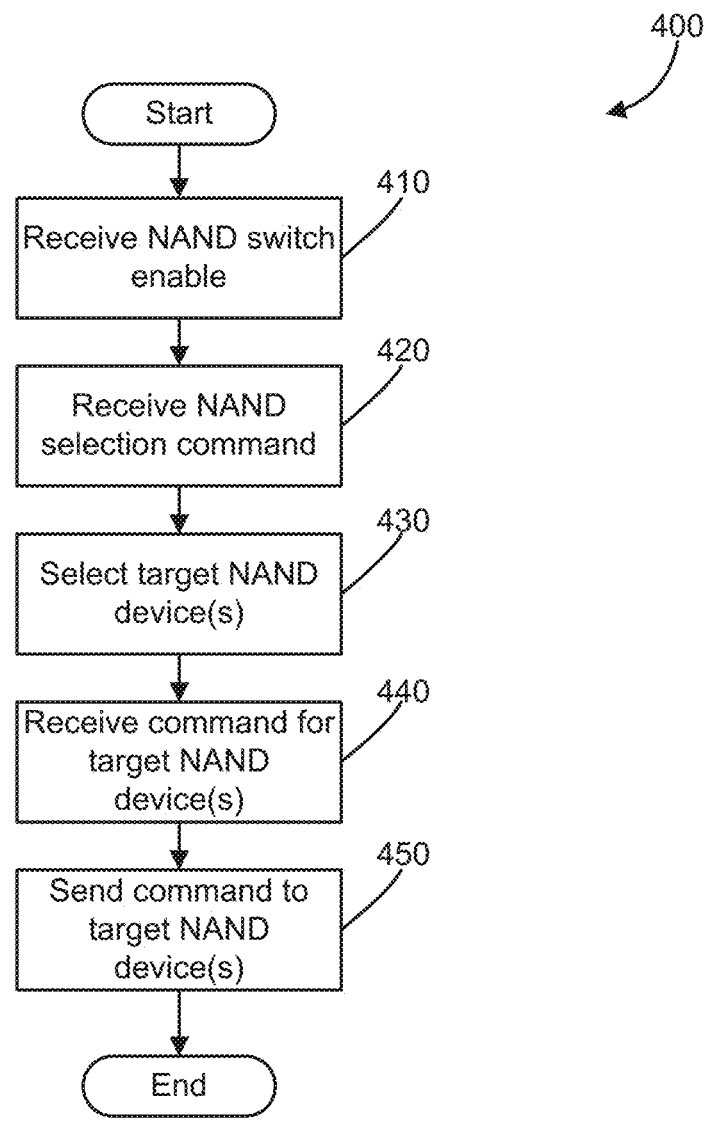
FIG. 4 is a flow diagram that depicts a general method of enabling and transmitting data over a communication path from an SSD controller to a target NAND storage device via a NAND switch, according to embodiments.

FIG. 4 is a flow diagram that depicts a method 400 of enabling and transmitting data over a communication path from an SSD controller 100 to a target NAND storage device 120 via a NAND switch 110, according to embodiments. Method 400 begins at step 410, where an enable signal is received by the NAND switch 110. In embodiments, the enable signal is received via the CE pin of NAND switch 110. At step 420, a NAND selection command is received. The selection command may be received through different means, as will be described herein. In addition, the NAND selection command may be received over one or more clock cycles, depending on how the command is transmitted from SSD controller 100 and on how the command is structured (i.e., whether the complete command is received over the data bus, in a register, or through pins other than the data bus).

Next, at step 430, once the command has been received, NAND switch 110 selects the target NAND storage devices 120 based on the received command. In embodiments, selection of a target NAND storage device 120 is performed by asserting appropriate output CE pins. After completion of step 430, a communication between SSD controller 100 and a target NAND storage device 120 is established.

At step 440, NAND switch 440 receives data for a target NAND storage device 120. In some embodiments, I/O data, a command, or an address is received for the target NAND storage device 120. It should be noted that, at this point of method 400, NAND switch 110 acts as a conduit (or a forwarding device) for SSD controller 100. Thus, at step 450, after receiving the command, I/O data, or address for the target NAND storage device 120, NAND switch 110 sends the command, I/O data, or address on to the target NAND storage device 120. It should be noted that steps 440 and 450 are repeated until the communication path between SSD controller 100 and the target NAND storage device 120 is disabled (or severed). In addition, in embodiments, a two-way communication path between the devices is enabled. This means that NAND switch 110 is capable of receiving data from a source NAND storage device 120 and transmitting such data to SSD controller 100. After step 450, method 400 terminates.

Figure 5A:
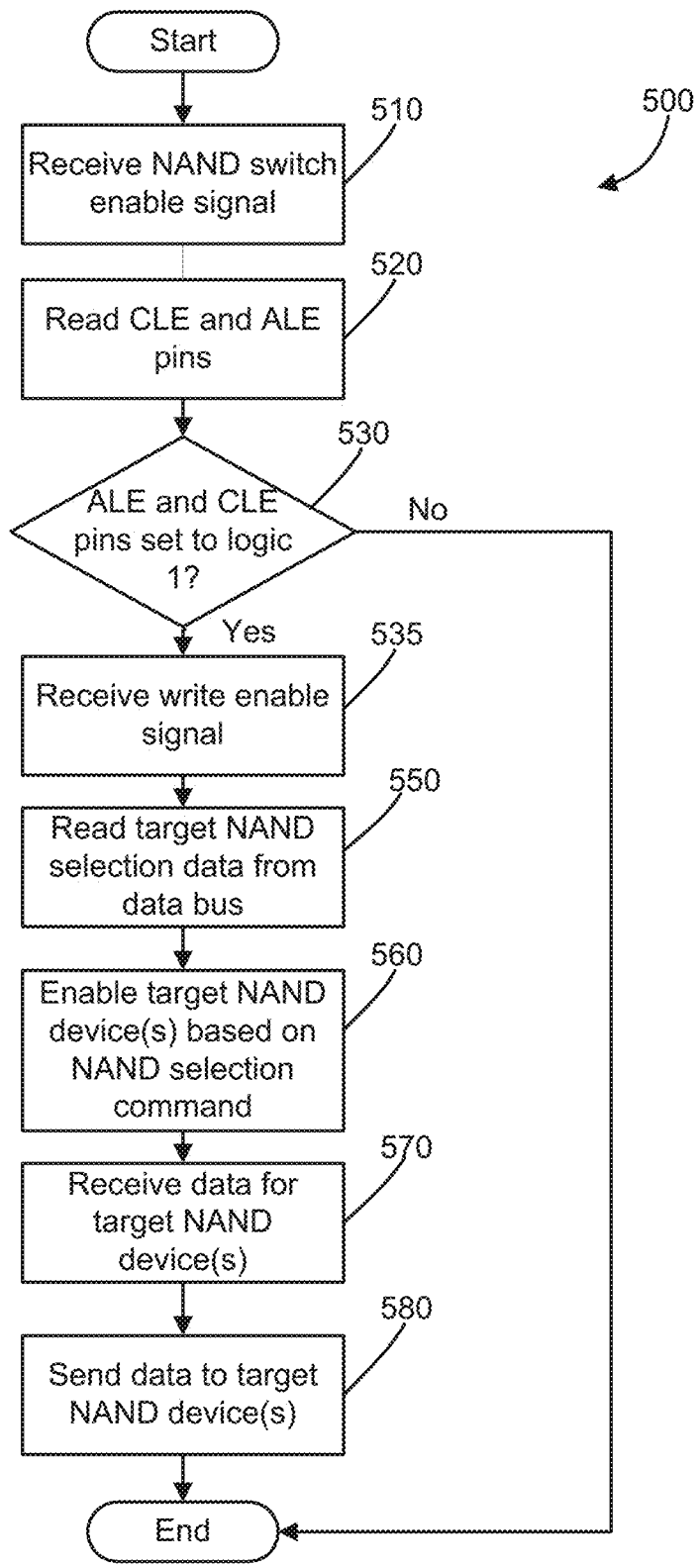
FIG. 5A is a flow diagram that illustrates a method of enabling and transmitting data over a communication path between an SSD controller and a target NAND storage device using a NAND switch, according to a first embodiment.

FIG. 5A is a flow diagram that illustrates a method 500 of enabling a communication path between an SSD controller 100 and a target NAND storage device 120 using a NAND switch 110, according to a first embodiment. FIG. 5A is described in conjunction with FIG. 5B, which is a signal diagram that depicts the timing of signals received and transmitted by NAND switch 110 at the various steps in method 500.

Method 500 begins at step 510, where NAND switch 110 receives an enable signal from SSD controller 100. As shown in FIG. 5A, the enable signal is received at an initial time to. In embodiments, the enable signal is transmitted by SSD controller 100 by asserting the CE pin of NAND switch 110. After NAND switch 110 receives the enable signal, NAND switch 110 is placed in an active state.

Next, at step 520, NAND switch 110 reads CLE and ALE pins. As shown in FIG. 5A, the CLE and ALE pins are asserted according to an assertion pattern by SSD controller 100 at time to. At step 530, NAND switch 110 determines whether the CLE and ALE pins are both asserted to logic "high" (i.e., a logical bit value of 1). If, at step 530, NAND switch 110 determines that both the CLE and ALE pins have been asserted to have a logical value of 1, then method 500 proceeds to step 535.

At step 535, NAND switch 110 receives a write enable signal. As shown in FIG. 5A, the write enable signal, denoted by WE, is received at time $t_1$. As previously mentioned, in embodiments, the WE signal triggers the NAND switch 110 to read incoming data from the data bus (i.e., from pins DQ).

Figure 5B:
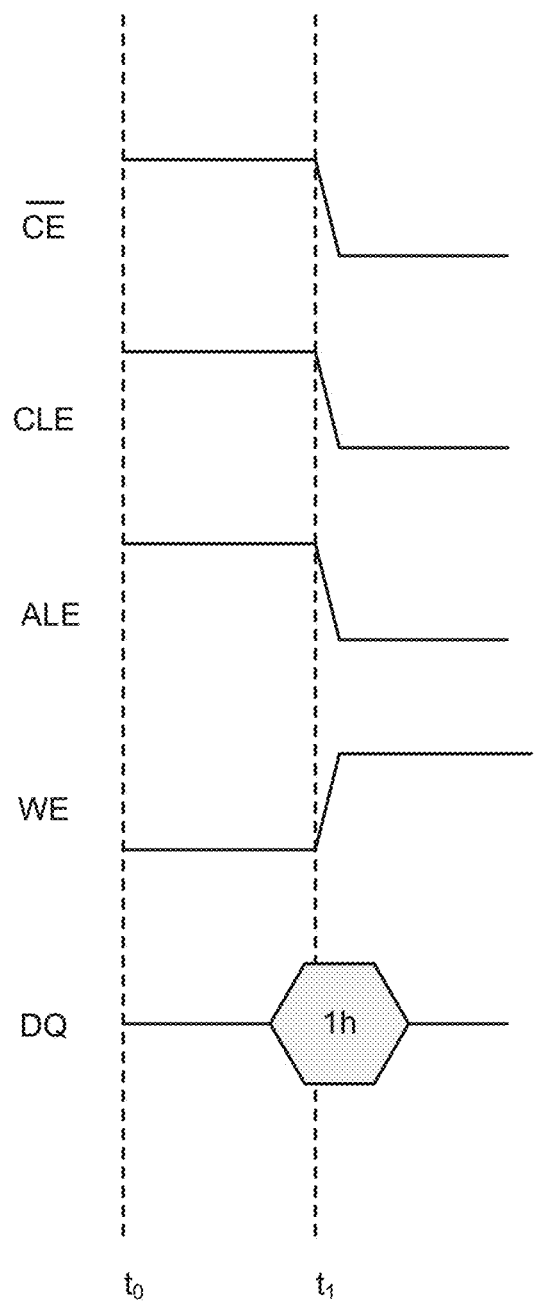
FIG. 5B is a signal diagram that depicts the timing of signals received by a NAND switch connected between an SSD controller and a target NAND storage device, according to the first embodiment.

Next, at step 550, NAND switch 110 reads target NAND selection data from the data bus. The target NAND selection data is transmitted by SSD controller 100 and, in embodiments, is read at a time $t_1$ on data bus DQ, as depicted in FIG. 5B. As shown in the example depicted in FIG. 5B, the value sent on data bus DQ is a hexadecimal value of 1. In embodiments, NAND switch 110 interprets this value as an indicator of which NAND storage devices 120 should be selected for enablement of a communication path. A hexadecimal value of 1 represents a bit pattern of "0001." Thus, in one or more embodiments, NAND switch 110 interprets this bit pattern as indicating that a communication path to one out of four of the NAND storage devices 120 connected to NAND switch 110 should be enabled. In this example, the NAND storage device 120 that corresponds to the lowest order bit would be enabled. In the embodiment depicted in FIG. 3, the NAND storage device 120 to be selected is the device that is connected to Out_CE0. Indeed, at step 560, NAND switch 110 selects the target NAND storage devices 120 based on the command received and read from the data bus DQ at step 550. Thus, after step 560, a communication path is enabled between SSD controller 100 and each of the selected NAND storage devices 120.

At step 570 of method 500, NAND switch 110 receives data for the selected target NAND storage devices 120. At step 580, NAND switch 110 sends the data received at step 570 to the selected target NAND storage devices 120. That is, once the communication paths from the SSD controller 100 to the selected target NAND storage devices 120 have been enabled, NAND switch 110 behaves as a conduit (or "pass-through") device, which relays data from SSD controller 100 to the enabled NAND storage devices 120. In addition, NAND switch 110 also relays data from the enabled NAND storage devices 120 to SSD controller 100. The data that is relayed from SSD controller 100 comprises command, address, and I/O data transmitted over data bus DQ, as well as pin assertions made by SSD controller 100 on pins ALE, CLE, RE, and WE. After step 580, method 500 terminates.

Figure 6A:
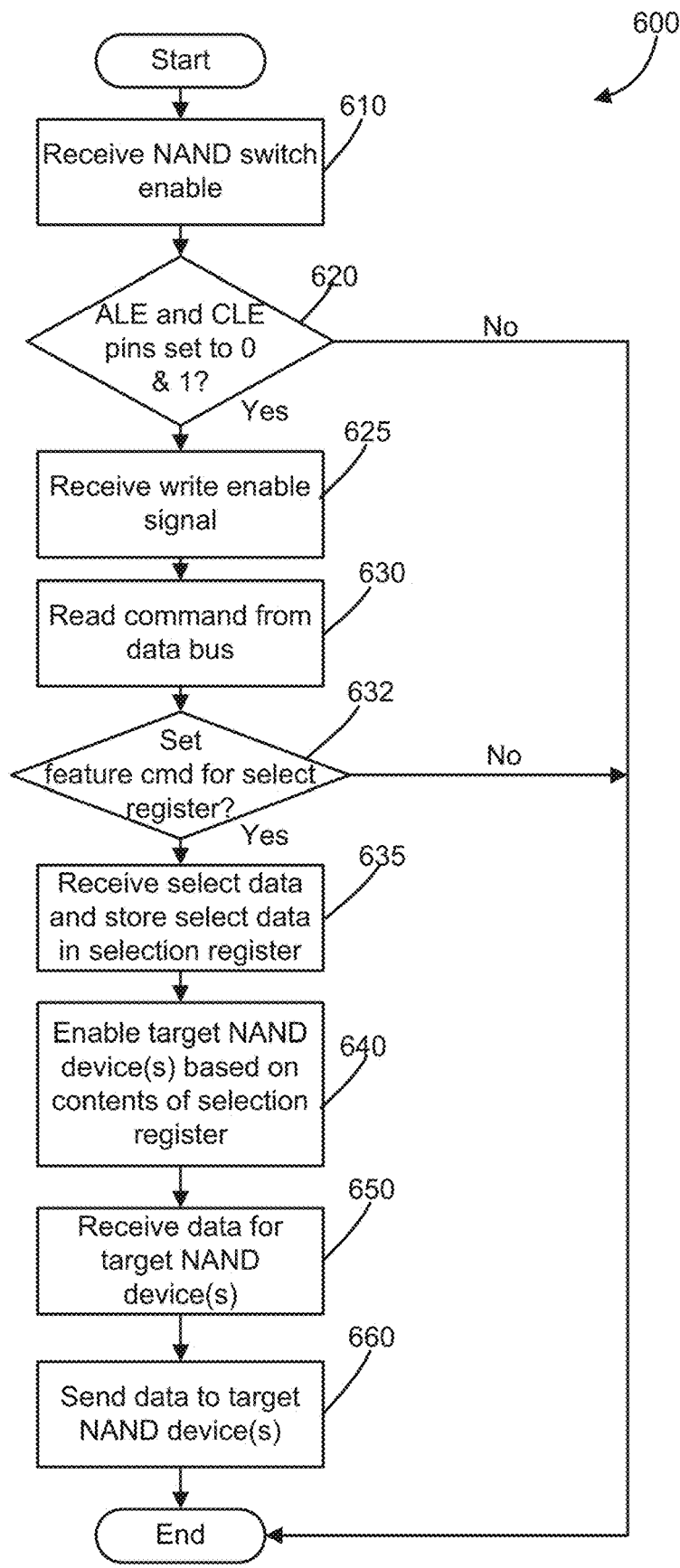
FIG. 6A is a flow diagram that illustrates a method of enabling and transmitting data over a communication path between an SSD controller and a target NAND storage device using a NAND switch, according to a second embodiment.

FIG. 6A is a flow diagram that illustrates a method 600 for enabling a communication path between an SSD controller 100 and a target NAND storage device 120 using a NAND switch 110, according to a second embodiment. Method 600 is described in conjunction with FIG. 6B, which depicts a signal diagram that illustrates the timing of signals received and transmitted by NAND switch 110 at the various steps of method 600.

Figure 6B:
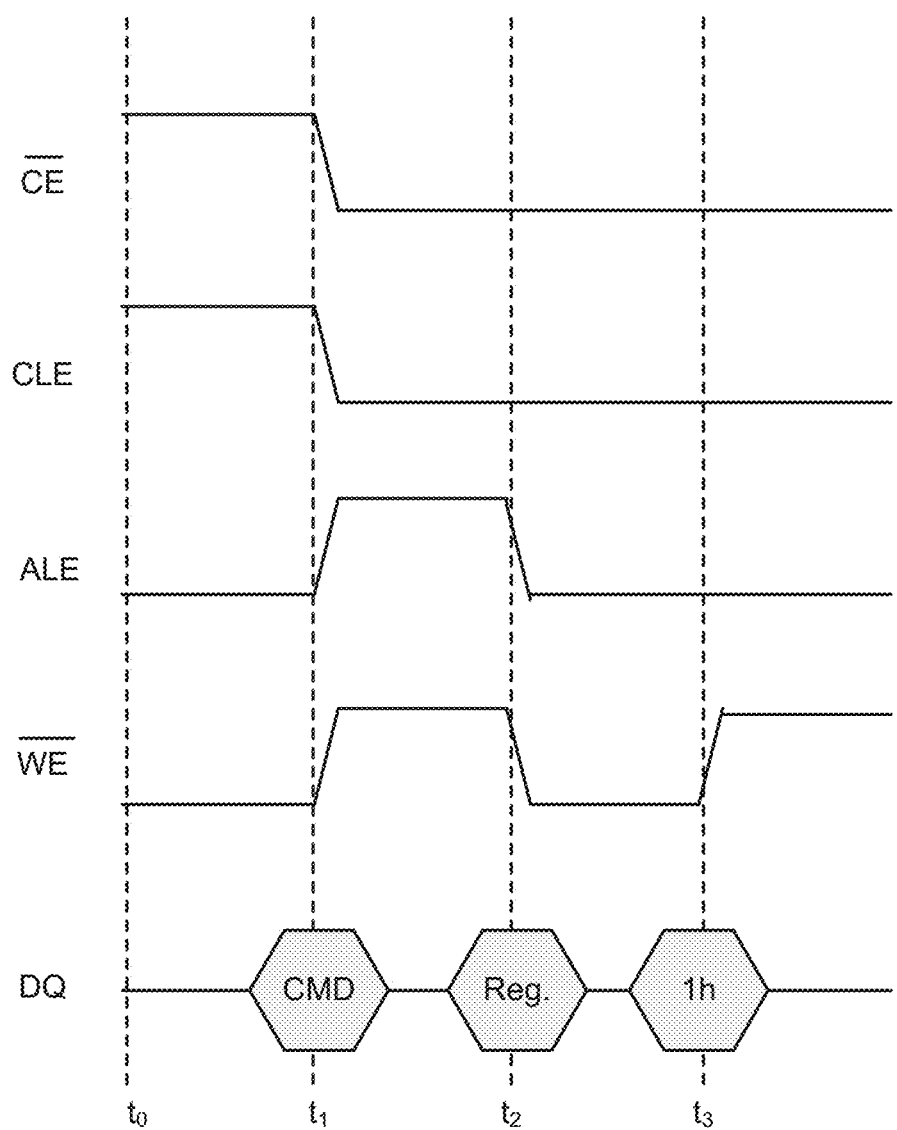
FIG. 6B is a signal diagram that depicts the timing of signals received by a NAND switch connected between an SSD controller and a target NAND storage device, according to the second embodiment.

Method 600 begins at step 610, where NAND switch 110 receives an enable signal from SSD controller 100. In embodiments, the enable signal is transmitted by SSD controller 100, which asserts the CE pin of NAND switch 110. As shown in FIG. 6B, the assertion of the CE pin of NAND switch 110 occurs at time $t_0$.

At step 620, NAND switch 110 determines whether a binary zero value (i.e., a low voltage) is asserted on the ALE pin and whether a binary one value (i.e., a high voltage) is asserted on the CLE pin. As shown in FIG. 6B, the assertion of the ALE and CLE pins of NAND switch 110 occurs, in embodiments, at time $t_1$. As was previously mentioned, when a zero value is asserted on the ALE pin and a one value is asserted on the CLE pin, embodiments of NAND switch 110 are configured to read a command from the data bus in a future clock cycle. Thus, if NAND switch 110 determines that the ALE and CLE pins are asserted, respectively, with binary values 0 and 1, method 600 proceeds to step 625.

At step 625, where NAND switch 110 receives a write enable signal. As previously mentioned, in embodiments, the write enable signal, denoted by WE in FIG. 6B, is received at time $t_1$. The WE signal triggers the NAND switch 110 to read incoming data from the data bus (i.e., from pins DQ).

At step 630, NAND switch 110 reads a command from the data bus (i.e., the DQ pins). This step is depicted, in FIG. 6B, as occurring at time t1. At step 632, NAND switch 110 interprets the command read from the data bus and determines if the command is a set features command for a register of the NAND switch 110. In embodiments, a set features command is a command that is part of the Toggle/ONFI protocol. In general, a set feature command that is transmitted to NAND switch 110 is followed by data that indicates the feature to be set, as well as data that is used to alter the target feature. Embodiments of NAND switch 110, in addition to the aforementioned input and output pins, may be configured with a register, referred to as a selection register. The selection register is used, in embodiments, to determine communication paths to NAND storage devices 120 connected to NAND switch 110 that are to be enabled. In such embodiments, NAND switch 110 will determine at step 632, whether the set feature command received at time $t_1$ is intended for the register that is configured with the switch. Note that in FIG. 6B, the register information is transmitted on data bus DQ at time $t_2$. In addition, it is noted that, also at time $t_2$, the ALE and CLE pins are asserted with values 1 and 0, which, as was previously mentioned, indicates that the data received on the data bus indicates an address (or, in the case of NAND switch 110, a register).

If NAND switch 110 determines that a set features command for the selection register has been received, method 600 then proceeds to step 635. At step 635, NAND switch 110 receives select data from the data bus and stores the select data in the selection register. In FIG. 6B, the select data is received on the data bus DQ at time $t_3$. In addition, pins ALE and CLE are set, respectively, to zero (i.e., a low voltage), which indicates that the data received over the data bus is I/O data. Method 600 then proceeds to step 640.

At step 640, NAND switch 110 enables communication paths to target NAND storage devices 120 based on the data stored in the selection register at step 635. As shown in FIG. 6B, a hexadecimal value of 1 is transmitted and received over the data bus. This is equivalent to a bit pattern of "0001." In one or more embodiments, each bit in the bit pattern corresponds to a CE pin on a NAND storage device 120 that is connected to NAND switch 110. In the example depicted in FIG. 6B, lower order bit 0 corresponds to pin Out_CE0, which is connected to the CE pin of NAND storage device $120_1$. Hence, in the example of FIGS. 6A and 6B, at step 640, a communication path to NAND storage device $120_1$ is enabled. Once step 640 of method 600 is completed, a communication path between SSD controller 100 and a NAND storage device 120 is enabled via NAND switch 110. Method 600 then proceeds to step 650.

At step 650, NAND switch 110 receives data for NAND storage device 120 from SSD controller 100. At step 660, NAND switch 110 sends the data received at step 650 to the selected NAND storage device 120. That is, at steps 650 and 660, NAND switch 110 acts as a conduit between SSD controller 100 and a NAND storage device 120. It should be noted that communication from the selected NAND storage device 120 and SSD controller via NAND switch 110 is also possible and is within the scope of the invention. After step 650, method 600 terminates.

Figure 7A:
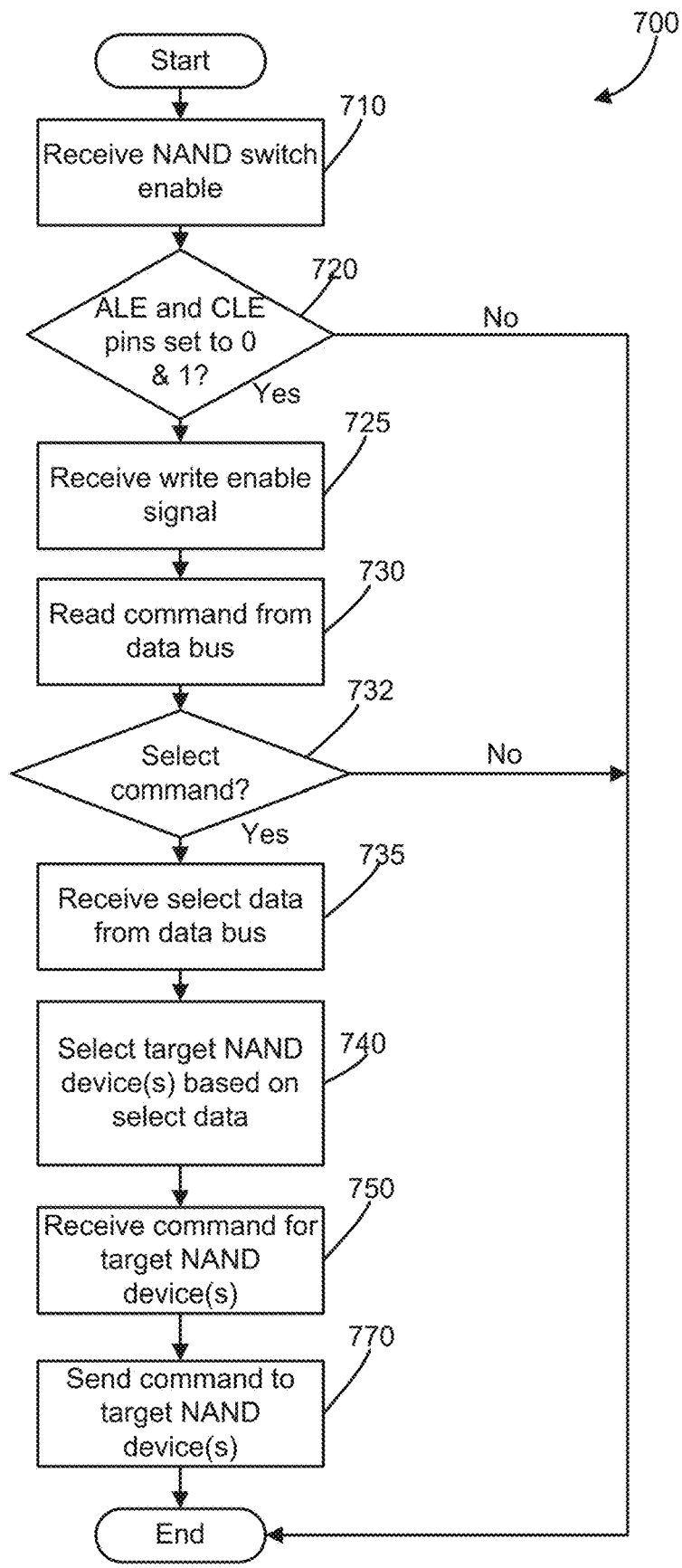
FIG. 7A is a flow diagram that illustrates a method of enabling and transmitting data over a communication path between an SSD controller and a target NAND storage device using a NAND switch, according to a third embodiment.

FIG. 7A is a flow diagram that depicts a method 700 of enabling a communication path from an SSD controller 100 to a NAND storage device 120 using a NAND switch 110, according to a third embodiment. Method 700 is described in conjunction with FIG. 7B, which depicts a signal diagram that illustrates the timing of signals that are received and transmitted by NAND switch 110 at the various steps of method 700.

Figure 7B:
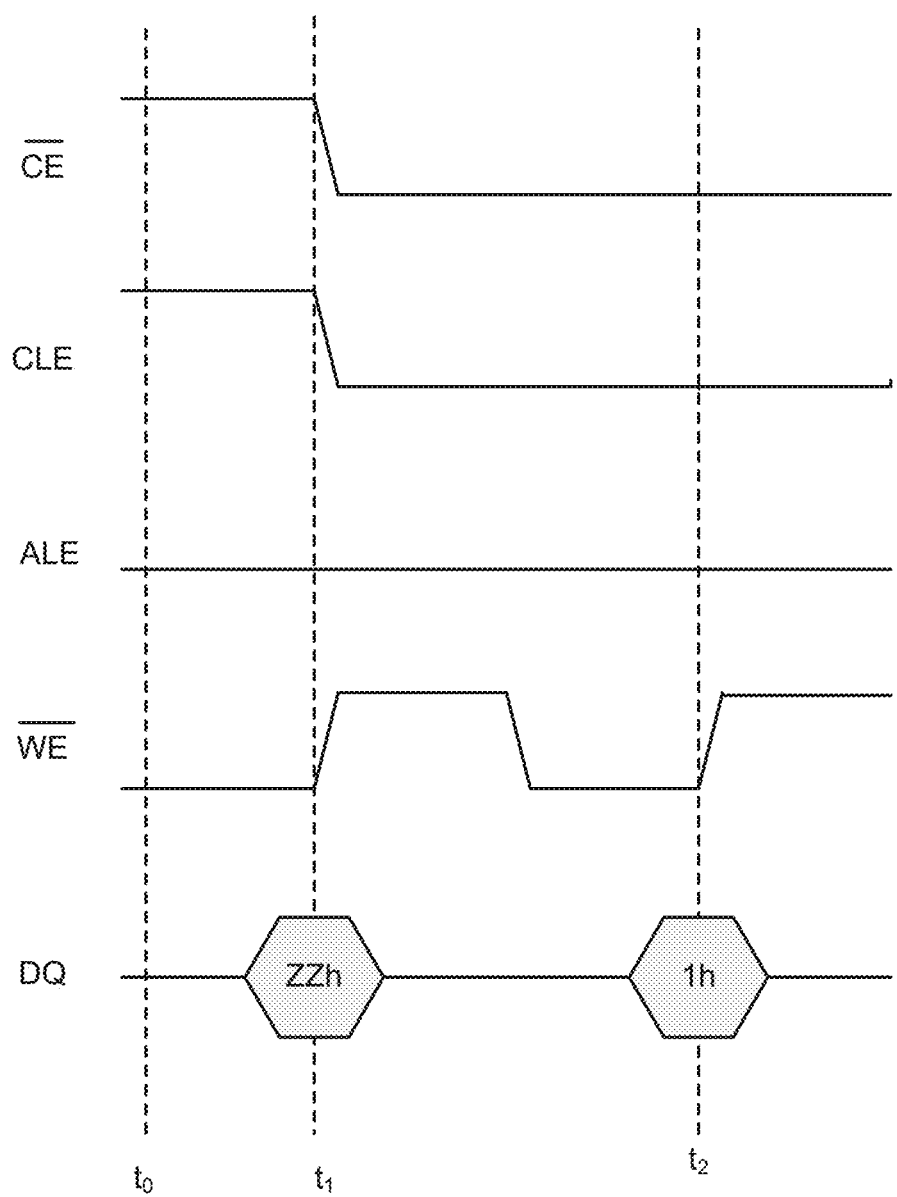
FIG. 7B is a signal diagram that depicts the timing of signals received by a NAND switch connected between an SSD controller and a target NAND storage device, according to the third embodiment.

As was the case with methods 500 and 600, method 700 begins, at step 710, where NAND switch 110 receives an enable signal from SSD controller 110. As shown in FIG. 7B, the enable signal from SSD controller 110 is received at time to.

At step 720, NAND switch 110 determines whether the ALE and CLE pins are set, respectively, to 0 and 1. As mentioned before, asserting the ALE (or address latch enable) pin to 0 and asserting the CLE (or command latch enable) pin to 1 indicates that the data to be received next from the data bus is a command. It is noted that, in FIG. 7B, the ALE and CLE pins are asserted to 0 and 1 at time to by SSD controller 100.

If, at step 720, NAND switch 110 determines that the ALE and CLE pins are set, respectively, to 0 and 1, then method 700 proceeds to step 725.

At step 725, a write enable signal is received. This signal, depicted as WE in FIG. 7B, is received at time $t_1$. As previously mentioned, the receipt of a WE signal triggers NAND switch 110 to read incoming data from the data bus.

At step 730, NAND switch 110 reads a command from the data bus. Note that, in FIG. 7B, the command is received from the data bus DQ at time $t_1$. Note also that, in FIG. 7B, the command is depicted as an arbitrary hexadecimal value ZZh. The command received at step 730 is not a command that is part of a well-known protocol, such as Toggle/ONFI. Note that the command that was received in method 600 is a set feature command, which is command that is native to the Toggle/ONFI protocol. By contrast, in the embodiment illustrated in FIGS. 7A and 7B, the received command is a manufacturer-specific command, which is meaningful only to the particular NAND switch 110 connected between SSD controller 100 and NAND storage devices 120. The command indicates to NAND switch 110 that further data that is to be used to determine communication paths for enablement is forthcoming.

Method 700 then proceeds to step 732, where NAND switch 110 determines if the command received at step 730 is a select command. If a select command was received, then method 700 proceeds to step 735. At step 735, NAND switch 110 receives select data from the data bus. As shown in FIG. 7B, the select data is received on data bus DQ at time t2. In FIG. 7B, the select data received is a hexadecimal value of 1, which, as was mentioned before, is equivalent to a bit pattern of "0001." As was the case for methods 500 and 600, each of the bits in the bit pattern corresponds to an Out CE pin of NAND switch 110, each of which is connected to a corresponding CE pin of a NAND storage device 120. In the example depicted in FIG. 7B, the low order bit 0 is set to 1, while the other bits are set to 0. This pattern serves as an indicator to NAND switch 110 that a communication path from SSD controller 100 to NAND storage device 120₁ is to be enabled through pin Out_CE0.

Method 700 then proceeds to step 740, where a communication path to the target NAND device 120 is enabled based on the select data received at step 735. As shown, the example of FIGS. 7A and 7B indicates that a communication path to NAND storage device 1201 is to be enabled. Thus, at step 740, NAND switch asserts pin Out_CE0, which is connected to the CE pin of NAND storage device 120, as depicted in FIG. 3. Thus, after step 740, a communication path between SSD controller 100 and NAND storage device 120 is enabled.

At step 750, NAND switch 110 receives data for NAND storage device 120 from SSD controller 100. At step 760, NAND switch 110 sends the data received at step 750 to the selected NAND storage device 120. That is, at steps 750 and 760, NAND switch 110 acts as a conduit between SSD controller 100 and a NAND storage device 120. As was previously mentioned, it should be noted that communication from the selected NAND storage device 120 and SSD controller via NAND switch 110 is also possible and within the scope of the invention. After step 760, method 700 terminates.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A memory system comprising:
a controller configured with a first enable output and a data output;
a plurality of non-volatile storage devices, each configured with an enable input and a data input; and
a first switch configured between the controller and a first set of the plurality of non-volatile storage devices, with
a first enable input that is connected to the first enable output of the controller,
a first data input that is connected to the data output of the controller,
a first data output that is connected to the data input of each of the first set of non-volatile storage devices, and
a plurality of enable outputs, each of the enable outputs being connected to the enable input of one of the first set of non-volatile storage devices,
wherein in response to the controller asserting the first enable output and transmitting select data which indicates one of the enable outputs of the first switch connected to an enable input of a first non-volatile storage device among the first set of non-volatile storage devices,
the first switch enables a first communication path between the controller and the first non-volatile storage device, and transmits a command and an address of the first non-volatile storage device which are received from the controller, to a data input of the first non-volatile storage device.

2. The memory system of claim 1, wherein
the controller is further configured with a second enable output, the memory system further comprises
a second switch configured between the controller and a second set of the plurality of non-volatile storage devices, with
a second enable input that is connected to the second enable output of the controller,
a second data input that is connected to the data output of the controller,
a second data output that is connected to the data input of each of the second set of non-volatile storage devices, and
a plurality of enable outputs, each of the enable outputs being connected to the enable input of one of the second set of non-volatile storage devices, and
wherein in response to the controller asserting the second enable output and transmitting select data which indicates one of the enable outputs of the second switch connected to an enable input of a second non-volatile storage device among the second set of the plurality of non-volatile storage devices,
the second switch enables a second communication path between the controller and the second non-volatile storage device, and transmits a command and an address of the second non-volatile storage device which are received from the controller, to a data input of the second non-volatile storage device.

3. The memory system of claim 1, wherein
the controller further comprises a first enablement pin and a second enablement pin, and
the first switch further comprises
a third enablement pin that is connected to the first enablement pin of the controller and
a fourth enablement pin that is connected to the second enablement pin of the controller.

4. The memory system of claim 3, wherein
the controller is configured to
assert both of the first and second enablement pins during a first clock cycle, and
transmit the select data through the data output during a second clock cycle that is subsequent to the first clock cycle.

5. The memory system of claim 3, wherein
the first switch is further configured with a selection register that stores a value of the select data that determines which of the enable outputs of the first switch is asserted.

6. The memory system of claim 3, wherein
the first switch is configured to:
receive data to be stored in the first non-volatile storage device through the first data input when the first and second enablement pins are not asserted;
receive a command to be executed by the first non-volatile storage device when the first enablement pin is not asserted and the second enablement pin is asserted; and
receive an address of a storage location within the first non-volatile storage device when the first enablement pin is asserted and the second enablement pin is not asserted.

7. The memory system of claim 1, wherein
one of the plurality of the enable outputs of the first switch is asserted based on the select data transmitted from the controller.

8. A method of performing read operation and write operation in a memory system having a controller connected to a plurality of non-volatile storage devices by way of a first switch including a first data input and a plurality of enable outputs, wherein each enable output is connected to an enable input of one of a first set of the non-volatile storage devices and the first data input is connected to a data output of the controller,
the method comprising:
asserting a first enable output of the controller, that is coupled to a first enable input of the first switch;
transmitting, from the controller to the first switch, select data which indicates one of the enable outputs of the first switch connected to an enable input of a first non-volatile storage device among the first set of the non-volatile storage devices;
enabling a first communication path between the controller and the first non-volatile storage device; and
transmitting, from a first data output of the first switch to a data input of the first non-volatile storage device, a command and an address of the first non-volatile storage device which are received from the controller.

9. The method of claim 8, wherein
the memory system further comprises a second switch including a second data input and a plurality of enable outputs, wherein each enable output is connected to an enable input of one of a second set of the non-volatile storage devices and the second data input is connected to the data output of the controller, and
the method further comprises:
asserting a second enable output of the controller, that is coupled to a second enable input of the second switch;
transmitting, from the controller to the second switch, select data which indicates one of the enable outputs of the second switch connected to an enable input of a second non-volatile storage device among the second set of the non-volatile storage devices;
enabling a second communication path between the controller and the second non-volatile storage device; and
transmitting, from a second data output of the second switch to a data input of the second non-volatile storage device, a command and an address of the second non-volatile storage device which are received from the controller.

10. The method of claim 8, wherein
the controller further comprises a first enablement pin and a second enablement pin, and
the first switch further comprises
a third enablement pin that is connected to the first enablement pin of the controller and
a fourth enablement pin that is connected to the second enablement pin of the controller.

11. The method of claim 10, further comprising:
asserting both of the first and second enablement pins during a first clock cycle, wherein
the select data is transmitted through the data output during a second clock cycle that is subsequent to the first clock cycle.

12. The method of claim 10, wherein
the first switch is further configured with a selection register that stores a value of the select data that determines which of the enable outputs of the first switch is asserted.

13. The method of claim 10, further comprising:
receiving data to be stored in the first non-volatile storage device through the first data input when the first and second enablement pins are not asserted;

receiving a command to be executed by the first non-volatile storage device when the first enablement pin is not asserted and the second enablement pin is asserted; and receiving an address of a storage location within the first non-volatile storage device when the first enablement pin is asserted and the second enablement pin is not asserted.

14. The method of claim 8, further comprising:
asserting one of the plurality of the enable outputs of the first switch based on the select data transmitted from the controller.

15. A memory system comprising:
a controller configured with a first chip enable output and a data output;
a first switch configured with
  a first chip enable input that is connected to the first chip enable output of the controller,
  a first data input that is connected to the data output of the controller,
  a first data output, and
  multiple chip enable outputs; and
a first set of multiple non-volatile storage devices each configured with
  a chip enable input that is connected to one of the chip enable outputs of the first switch, and
  a data input that is connected to the first data output of the first switch,
wherein the first switch is configured between the controller and the first set of multiple non-volatile storage devices, and
wherein in response to the controller asserting the first chip enable output and transmitting select data that indicates one of the chip enable outputs of the first switch connected to the chip enable input of a first non-volatile storage device among the first set of multiple non-volatile storage devices,
  the first switch enables a first communication path between the controller and the first non-volatile storage device, and transmits a command and an address of the first non-volatile storage device which are received from the controller, to a data input of the first non-volatile storage device.

16. The memory system of claim 15, wherein
the controller is further configured with a second chip enable output,
the memory system further comprises:
  a second switch configured with
    a second chip enable input that is connected to the second chip enable output of the controller,
    a second data input that is connected to the data output of the controller,
    a second data output, and
    multiple chip enable outputs; and
  a second set of multiple non-volatile storage devices each configured with
    a chip enable input that is connected to one of the chip enable outputs of the second switch, and
    a data input that is connected to the second data output of the second switch,
  wherein the second switch is configured between the controller and the second set of multiple non-volatile storage devices, and
  wherein in response to the controller asserting the second chip enable output and transmitting select data that indicates one of the chip enable outputs of the second switch connected to the chip enable input of a second non-volatile storage device among the second set of multiple non-volatile storage devices,
    the second switch enables a second communication path between the controller and the second non-volatile storage device, and transmits a command and an address of the second non-volatile storage device which are received from the controller, to a data input of the second non-volatile storage device.

17. The memory system of claim 15, wherein
the controller further comprises a first enablement pin and a second enablement pin, and
the first switch further comprises
  a third enablement pin that is connected to the first enablement pin of the controller and
  a fourth enablement pin that is connected to the second enablement pin of the controller.

18. The memory system of claim 15, wherein
one of the multiple chip enable outputs of the first switch is asserted based on the select data transmitted from the controller.

* * * * *